US006660920B2

(12) United States Patent
Osuga

(10) Patent No.: US 6,660,920 B2
(45) Date of Patent: Dec. 9, 2003

(54) MUSIC OPERATOR WITH TENSION STRING FOR SENSING ACTION INPUT

(75) Inventor: Ichiro Osuga, Hamamatsu (JP)

(73) Assignee: Yamaha Corporation, Hamamatsu (JP)

( * ) Notice: Subject to any disclaimer, the term of this patent is extended or adjusted under 35 U.S.C. 154(b) by 0 days.

(21) Appl. No.: 10/090,982

(22) Filed: Mar. 4, 2002

(65) Prior Publication Data

US 2002/0124712 A1 Sep. 12, 2002

(30) Foreign Application Priority Data

Mar. 6, 2001 (JP) ....................................... 2001-062683

(51) Int. Cl.[7] .................................................. G01C 3/12

(52) U.S. Cl. ............................. 84/439; 84/440; 84/442; 84/423 R; 84/427

(58) Field of Search .......................... 84/439, 440, 441, 84/442, 423 R, 427

(56) References Cited

U.S. PATENT DOCUMENTS 5,574,241 A * 11/1996 Kumano et al. .............. 84/439
5,578,782 A * 11/1996 Masubuchi .................. 84/687

FOREIGN PATENT DOCUMENTS

JP 55-35716 9/1980
JP 59-189515 10/1984

* cited by examiner

*Primary Examiner*—Shih-Yung Hsieh
(74) *Attorney, Agent, or Firm*—Morrison & Foerster LLP

(57) ABSTRACT

An operation apparatus is responsive to a physical action for inputting a control parameter of a musical sound into an electronic musical instrument. The operation apparatus is provided with a plurality of movable members individually responsive to the physical action to undergo a reciprocal movement. A frame mounts the plurality of the movable members in aligned manner. A tension member having a length is supported at both ends thereof by the frame to extend along the movable members such that each movable member may come into contact with the tension member during the course of the reciprocal movement of each movable member. A detector is connected to the tension member for detecting a deflection of the tension member caused by the contact of the movable member, and generates a signal corresponding to the detected deflection as the control parameter. A support member is arranged on the frame for supporting the tension member such that the support member acts on the tension member to restrict the deflection thereof around the movable member which contacts the tension member, thereby avoiding the deflection from spreading along the length of the tension member.

21 Claims, 16 Drawing Sheets

MUSIC OPERATOR WITH TENSION STRING FOR SENSING ACTION INPUT

BACKGROUND OF THE INVENTION

1. Technical Field

The present invention relates to an operation apparatus for controlling musical sound properties such as timbre, volume, various effects, etc. of the musical sound on an electronic musical instrument.

2. Prior Art

There are many types of electronic musical instruments including not only electronic keyboard instruments such as an electronic organ, a synthesizer, etc., but also an electronic drum, a rhythm machine, a sequencer, an electronic wind instrument, a MIDI controller, etc. equipped with operation elements (operation keys).

For example, a key of an electronic keyboard instrument functions as an operation element for generating a sound at a specified interval. This key is also used as a control operation element for diversifying the musical sound by varying the musical sound's volume or timbre at the time of generating the sound or after sounding or by adding ornamental effects such as tremolo, vibrato, panning, repeated beat, etc. Magnitude of a press force may be controlled simultaneously with a key press operation for performance so that both the sound generation and its control are available, allowing versatile, unrestricted performance by means of so-called after-touch control. A typical mechanism for enabling this control uses all arranged keys or a plurality of keys within a given range as control operation elements. A pressure sensor senses a key pressure when or after a key is pressed, thereby realizing the musical sound control according to the key press. In such a mechanism, a band-shaped pressure sensor extends across the longitudinal array of control keys or interlocking members thereof, and is arranged at a position where a key pressure is applied. The pressure sensor outputs a signal corresponding to the key pressure applied to any one of the control keys. A control section controls the musical sound according to that signal.

However, such a band-shaped pressure sensor generally has a length equivalent to several keys to several tens of keys, increasing costs and time for manufacturing and installing the pressure sensor. Consequently, this also creates increased manufacturing costs of electronic keyboard instruments using this pressure sensor.

By contrast, there is proposed an after-touch control mechanism having a single sensor covering commonly over a plurality of keys (Examined Patent Publication (Kokoku) 55-35716). This mechanism has a keyboard support frame extending along an array of keys of a keyboard apparatus and makes this support frame rotatable vertically. A shutter plate is mounted on a given location of this support frame. The shutter plate is positioned between a lamp and a photoconductor both mounted on the instrument itself, constituting an optical sensor mechanism. When a key press action rotates the support frame in this mechanism, the shutter rotates according to the amount of the support frame rotation to vary a light volume reaching the photoconductor from the lamp. The mechanism provides a sound volume variation according to the key pressure. However, since this mechanism is provided with the support frame extending along the array of keys of the keyboard apparatus, pressing a key always moves the support frame, thereby causing a stiff touch and increasing manufacturing costs.

In addition, there is proposed a switch apparatus having a single member acting commonly on a plurality of operation elements (Japanese Patent Unexamined Publication No. Shou. 59-189515). On this apparatus, a plurality of operation elements constitute a slide switch which slides vertically along the array of the operation elements. An interlocking member such as a wire, a string, etc. extends along the array of the operation elements. The interlocking member is stretched by a spring and is connected to the operation elements. In this apparatus, when one operation element is slid from a neutral position, the interlocking member is bent in a V shape along the slide direction against a spring force. When another operation element is slid, this movement returns the former operation element to the neutral position. This mechanism moves only one operation element to the slide position, thereby simplifying a structure for selecting timbres of the electronic musical instrument. However, this switch apparatus just provides an on/off select function by sliding the operation element, not suited for accurate after-touch control in response to key pressures.

Further, the electronic musical instrument controls dynamics and ornamental effects of the sound by manipulating operation elements other than the keyboard. There is a demand for a mechanism which can easily and reliably perform these operations.

SUMMARY OF THE INVENTION

It is an object of the present invention to provide an operation apparatus for the electronic musical instrument capable for solving problems of the conventional technology and accurately implementing after-touch control and other musical sound controls with a simple structure.

In order to achieve the aforementioned objects, the present invention provides an operation apparatus responsive to a physical action for inputting a control parameter of a musical sound into an electronic musical instrument. The operation apparatus comprises a plurality of movable members individually responsive to the physical action to undergo a reciprocal movement, a frame that mounts the plurality of the movable members in aligned manner, a tension member having a length and a pair of ends, and being supported at both the ends by the frame to extend along the movable members such that each movable member may come into contact with the tension member during the course of the reciprocal movement of each movable member, a detector connected to the tension member for detecting a deflection of the tension member caused by the contact of the movable member and generating a signal corresponding to the detected deflection as the control parameter, and a support member arranged on the frame for supporting the tension member such that the support member acts on the tension member to restrict the deflection thereof around the movable member which contacts the tension member, thereby avoiding the deflection from spreading along the length of the tension member.

Preferably, the support member may be arranged between a pair of movable members which are aligned adjacently with one another. The support member may have a groove for receiving therein the tension member.

Preferably, the operation apparatus may further comprise an operating element manually operable for applying the physical action to the movable member, and a stopper provided on the frame for stopping the operating element, wherein the support member comprises a deformable soft part of the stopper. The operation apparatus may further comprise a soft cover member that covers the tension member and the support member disposed along the tension member against the movable members, and that has a flexibility capable of transmitting the reciprocal movement of each movable member to the tension member to create the deflection. The operation apparatus may further comprise an elastic member engaged between the frame and the end of the tension member for regulating the deflection of the tension member.

DETAILED DESCRIPTION OF THE INVENTION

Figure 1:
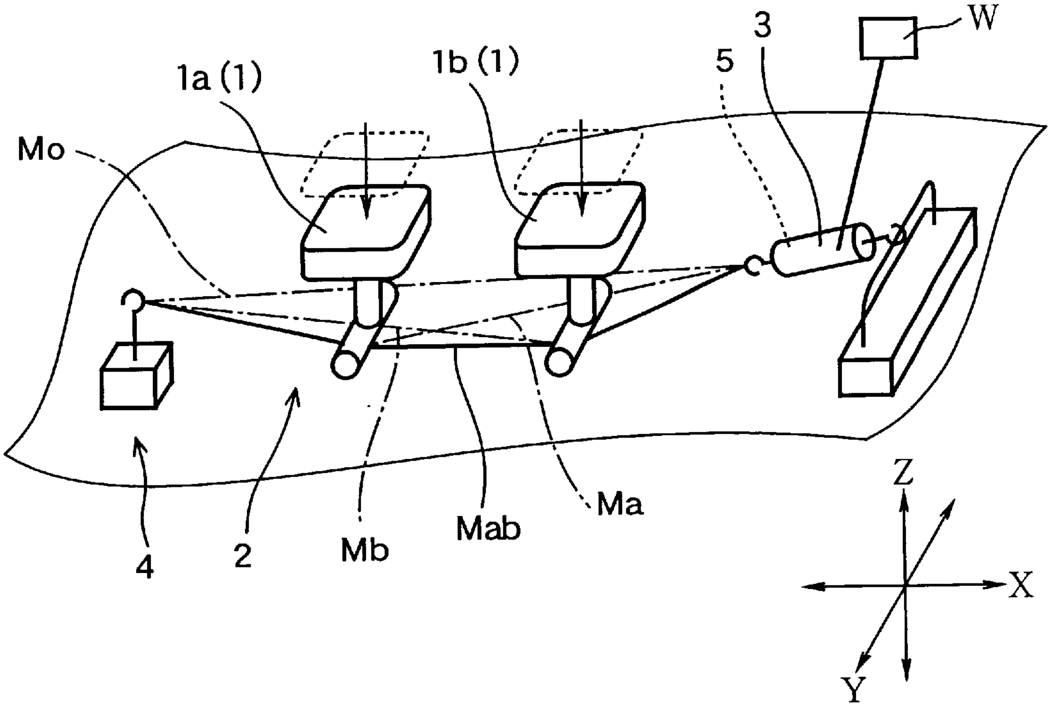
FIG. 1 is a perspective view schematically showing an electronic musical instrument operation apparatus having a basic structure according to the present invention.

Embodiments of the present invention will be described with reference to the accompanying drawings. In a plurality of embodiments to follow, the same or similar parts are depicted by the same reference numerals.

Referring to FIG. 1, the following describes a basic operation apparatus configuration. FIG. 1 schematically shows the operation apparatus. This mechanism comprises a movable member 1 and a tension member 2. The movable member 1 comprises an operation element itself or interlocks with the operation element. The tension member 2 is pressed by the movable member 1. For simplicity of the embodiment explanation, the figure shows a few of movable members. The present invention is applied to a necessary number of movable parts. Keys on an electronic keyboard instrument or members interlocking with the keys are made movable, and the present invention is typically applied to these movable parts. The movable member 1 is provided in a reciprocally movable direction across the tension member. Directions crossing the tension member include a y direction which is orthogonal to an aligning direction x of the movable members and which covers a horizontal plane, a z direction which is orthogonal to the aligning direction x and covers a vertical plane, or an intermediate direction between the y and z directions. Further, the directions crossing the tension member include any direction including direction components along the yz plane and the x direction components.

The movable member 1 can be used for musical sound operation parts of various electronic musical instrument. For example, the movable member can function as a plurality of operation parts for controlling the musical sound such as keys on an electronic keyboard instrument, operation keys on an electronic percussion instrument simulating a cymbal or a hand clap by means of fingers or the palm of the hand, finger operation keys of an electronic wind instrument, foot-operated volumes, pedals, switches, etc. The movable member can be pressed, pulled, twisted, etc. by a physical action to generate various movements such as a linear motion, a rotational motion, a combination of these motions, etc. of the movable member. Generally, a spring force acts on the movable member. When a player applies a force to an operation element such as a key, the associated movable member moves into a given direction. When the player releases the operation element, the associated movable member returns to its original position, thereby causing reciprocal movement. It may be preferable to manually create the reciprocal movement by means of player's actions. The movable member includes not only a directly operated part, but also a part operating from the directly operated part via a mechanical or fluid transmission section such as a link mechanism, a wrapping mechanism, a fluid transmission apparatus, etc.

The tension member 2 can comprise various linear bodies such as a string, wire, tape, coil spring, etc. Since the tension member 2 engages with the movable member 1, the tension member 2 causes deflections in various directions according to movement directions of the movable member 1 or its interlocking member. When an operation is released, the tension member 2 elastically restores its original position. When a plurality of movable members are operated concurrently, the tension member 2 causes deflections according to movement directions of the respective movable members or the corresponding interlocking members.

Figure 2:
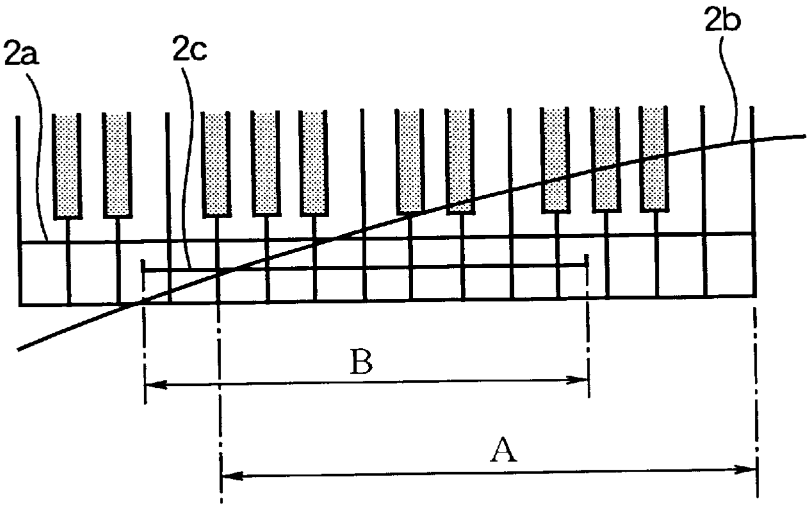
FIG. 2 is a plan view exemplifying arrangement for installing the operation apparatus according to the present invention on an electronic piano.

When there are provided a plurality of movable members, the tension member 2 is provided along the aligning direction of the movable members. FIG. 2 shows various stretch forms of the tension member in case a key of the electronic keyboard instrument is used as an operation element. For simplicity, examples in the figure assume that the tension member is deflected when any point on the bottom surface of the keyboard touches the tension member. Accordingly, it is assumed that there is provided an additional control such as a tone change, etc. in response to sounding by a key press. As shown in the figure, a tension member 2*a* is arranged parallel to the aligning direction of the movable members. A tension member 2*b* inclines with reference to the aligning direction of the movable members and is positioned so as to cover operations of movable members for the musical sound control within the range of A. A tension member 2*c* is parallel to the aligning direction of the movable members and extends across the range B of movable members used for the musical sound control. It is desirable to arrange the tension member parallel to the aligning direction of the movable member. If the tension member inclines against the lineup direction of the keys, the tension member may be positioned so that it can cause a deflection in response to a movable member operation. When the movable members are lined up and the tension member is stretched along a direction other than the parallel direction, this arrangement provides effective means for continuously changing the sensitivity between high-tone and low-tone sides. The tension member 2 may be provided within a range capable of responding to operations of the movable member 1.

On an electronic keyboard instrument, for example, the tension member may be positioned below the keyboard along the aligning direction of keys so as to generate deflection in response to a key press operation. In this case, the tension member can be provided in a direction other than that parallel to the key aligning direction.

Referring back to FIG. 1, the operation apparatus uses the detector 3 to detect a physical quantity change of the tension member deflected by the movable member for controlling musical sounds. The musical sound to be controlled can be subject to various musical sound controls such as note-on/off timing, loudness, timbre, pitch, panning, etc. on an electronic musical instrument equipped with the aforementioned mechanism. Normally, the operation apparatus controls musical sounds generated simultaneously with or after a note-on event caused by manipulation of the operation element.

According to the operation apparatus shown in FIG. 1, the tension member 2 is positioned to M0 in the figure when the operation elements such as keys are not operated and movable members 1*a* and 1*b* are both in the Off state. The tension member 2 moves to the following positions according to manipulation of the operation elements.

Movable member 1*a*=on and movable member 1*b*=off: Ma in FIG. 1

Movable member 1*a*=off and movable member 1*b*=on: Mb in FIG. 1

Both the movable members 1*a* and 1*b*=on: Mab in FIG. 1

When the movable member is positioned in the middle of the On and Off states, the tension member 2 is located somewhere in an area bordered by M0 and Mab. The position of the tension member 2 is affected by movement of the movable members. In case of increased number of movable members, the structure in FIG. 1 makes it difficult to detect a stroke (moving state) of the movable member at the center of a row of movable members if those on both sides also move greatly. For example, suppose a movable member 1*c* is placed between the movable members 1*a* and 1*b* in FIG. 1. When the tension member is positioned to Mab, it is impossible to detect a stroke of the movable member 1*c*. Accordingly, it is impossible to reliably control the musical sound by means of a plurality of operation elements. Based on the aforementioned basic mechanism, the present invention provides an operation apparatus effective for reliably detecting movable member strokes independently of a plurality of movable members. The following describes a practical embodiment of the present invention.

Figure 3:
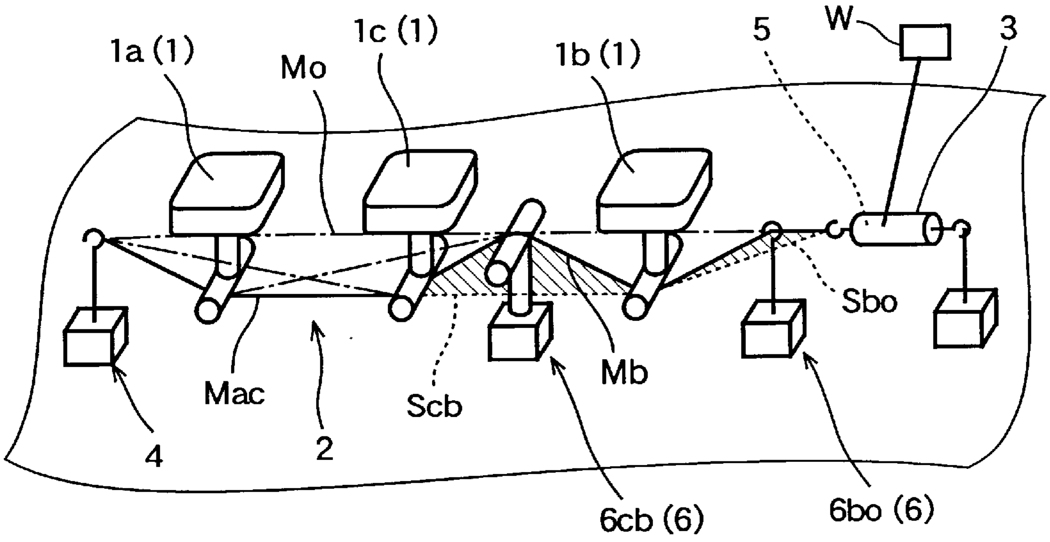
FIG. 3 is a perspective view schematically showing an example of the electronic musical instrument operation apparatus according to the present invention.

FIG. 3 schematically shows the operation apparatus. This mechanism comprises a plurality of movable members 1 reciprocally moved by a music performance operation; a support frame 4 supporting the movable members; and a tension member 2 supported by the support frame. The tension member 2 is provided with a detector 3. When the movable member 1 is operated around one end of the tension member 2, the detector 3 detects a change in a lengthwise direction of the tension member due to deflection caused by a contact with the operated movable member. The detector 3 can use various sensors. For example, a displacement sensor can be used to detect displacement due to a change in the tension member length. Alternatively, a pressure sensor can be used to detect a tension force variation caused by a change in the tension member length and a tension force of an elastic member 5. The detector 3 is connected to a control section W including a comparator, a microprocessor, etc. One end of the tension member 2 is fixed to the support frame 4. The other end is supported by the support frame 4 via the elastic member 5 built in the detector 3. In this embodiment, a support member 6 is allowed to stand on the support frame 4 so as to support the middle of the tension member 2. Namely, a support member 6*cb* is provided between the movable members 1*c* and 1*b*. A support member 6*b*0 is provided between the movable member 1*b* and the detector 3 (and the support frame 4).

The operation apparatus in FIG. 3 operates as follows. When the operation element (not shown) act on the movable members 1*a* and 1*b,* the movable members contact with the tension member 2 deflect the tension member. Without the support member 6, the tension member 2 is positioned to Scb and Sb0 indicated by a broken line. Since this embodiment uses the support member 6, the tension member 2 is positioned to Mac and Mb indicated by a solid line. Namely, shaded areas in FIG. 3 are excluded from a moving area for the tension member. Accordingly, when the tension member 2 is positioned to M0 with the movable members 1*a* and 1*b* being moved, pressing the movable member 1*c* deflects the tension member 2 to position Mac. As a result, it is possible to cause a positional change of the tension member 2 even if any of the movable members 1*a,* 1*b,* and 1*c* is moved in any combination. This enables the detector 3 to reliably detect positional changes. Since the moving area is restricted by sub-dividing the tension member, the detector 3 can reliably detect deflection of the tension member 2, i.e., a movable member's stroke independently of the movements of the remaining movable members.

Figure 4:
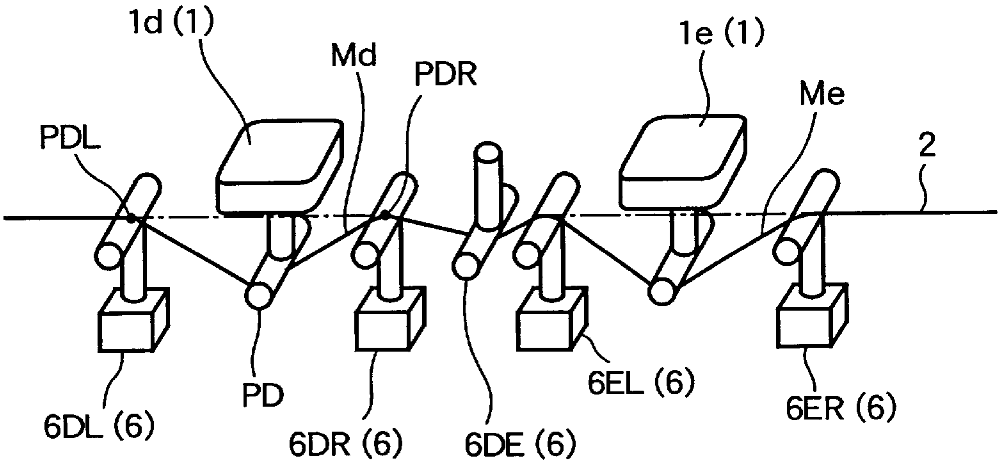
FIG. 4 is a perspective view schematically showing another example of the electronic musical instrument operation apparatus according to the present invention.

FIG. 4 shows an example of providing support members 6 so as to further segment the moving area of the tension member 2 into small portions. (FIG. 4 and succeeding figures only show major parts and omit surrounding parts.) Namely, the support member 6 is provided between adjacent movable members 1, preferably along a line connecting the centers of adjacent movable members 1, on the support frame. When the tension member 2 is positioned to PDL, PD, and PDR in the figure, for example, points PDL and PDR on the tension member 2 are stationary due to support members 6DL and GDR. Accordingly, it is understood that the tension member moves to point PD completely due to the movable member 1*d*. Providing the support member 6 between adjacent movable members 1 segments the moving area for the tension member 2 into smaller portions, allowing reliable detection of a stroke of the movable member 1. Further, it is also possible to provide a support member 6DE for more finely segmenting the tension member 2.

Figure 5:
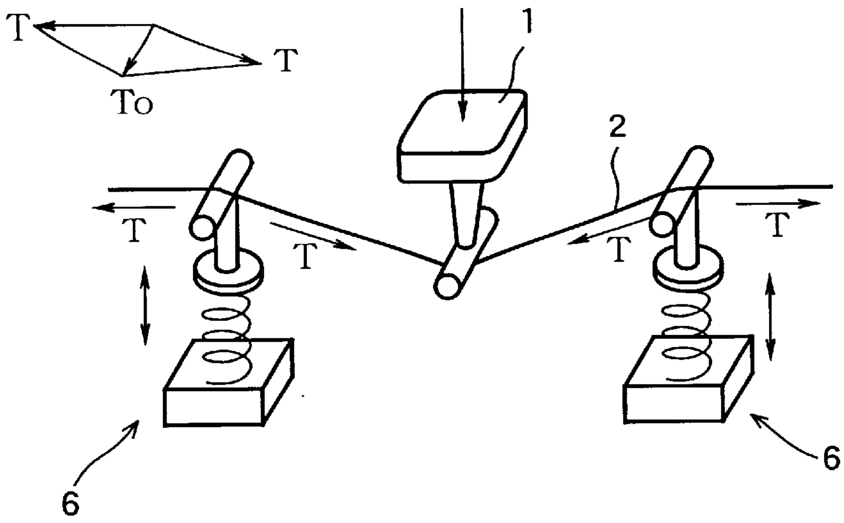
FIG. 5 is a perspective view schematically showing yet another example of the electronic musical instrument operation apparatus according to the present invention.

FIG. 5 shows the behavior when the support member 6 is made of a deflectable material. The movable member 1 moves to deflect the tension member 2. At this time, tension T occurs in a direction which forms an angle corresponding to deflection of the tension member 2 demarcated by a contact point between the support member 6 and the tension member 2. The resultant force becomes T0 as indicated by an arrow in FIG. 5. Accordingly, the support member 6 elastically deforms until balanced with resultant force T0 by forming an angle somewhat deviating from a direction orthogonal to the initial position of the tension member 2. When adjacent movable members move, a degree of effect from the both determines a position of the support member therebetween after deformation. When a deflectable support member is used to segment the moving area of the tension member 2, it is desirable to provide an appropriate segmentation effect by adjusting factors for determining the deformation state such as an elastic coefficient, a deformation region, a deformation shape, etc. As will be described later, the support member can comprise a soft part of a stopper acting on the sound generating operation element such as a key or on a member interlocking with this operation element. In this case, the support member is formed in a band continuously extending across a plurality of operation elements etc. Contact with the adjacent movable member may have an effect on the contact point with the relevant movable member. It is especially important to adjust factors for determining deformation states of the support member.

Figure 6:
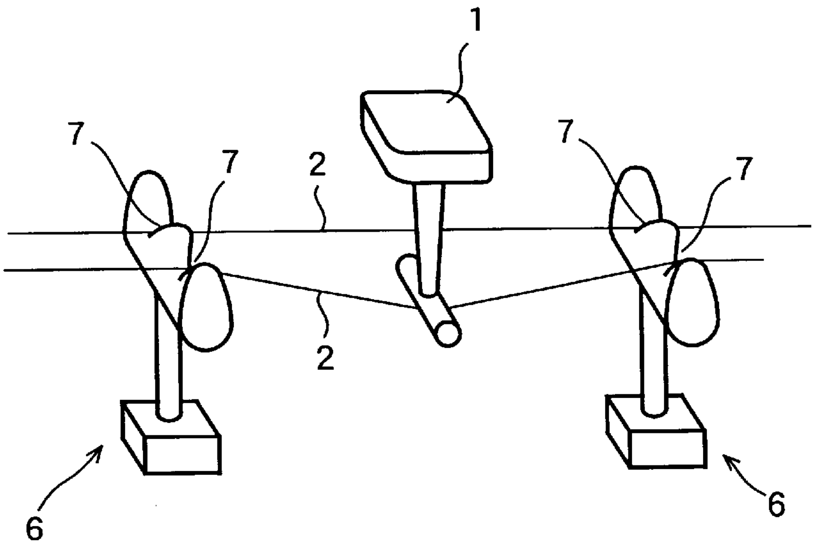
FIGS. 6(*a*) and 6(*b*) are a perspective view schematically showing still another example of the electronic musical instrument operation apparatus according to the present invention.
Figure 6:
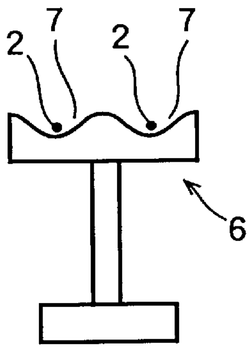
Figure 7:
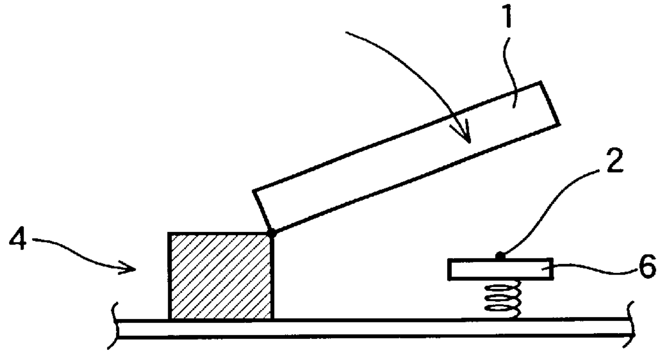
FIGS. 7(*a*) and 7(*b*) are a perspective view schematically showing still another example of the electronic musical instrument operation apparatus according to the present invention.
Figure 7:
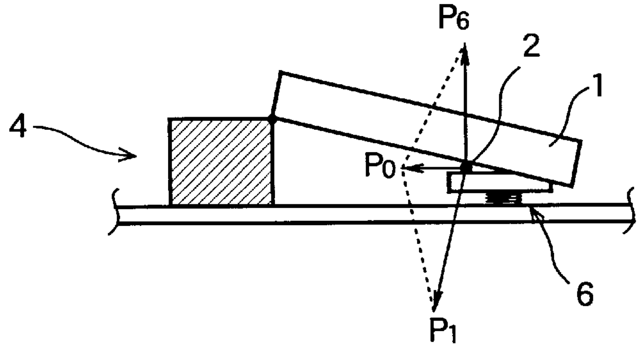

FIG. 6 shows an example of providing a groove 7 in the support member 6 on a surface contacting with the tension member 2 along this tension member. Providing the groove 7 like this can place and support the tension member 2 in the groove. When the movable member 1 moves the tension member 2, the tension member 2 moves without coming out of the groove, stabilizing operations. As a result, it is possible to more accurately detect a change in the tension member.

The support member 6 without this groove may cause a problem as shown in FIG. 6. For example, a pressure of the movable member 1 is applied to the tension member 2 on the deflectable support member 6 without the groove. The tension member 2 is subject to force P1 from the movable member 1 and force P6 from the support member 6, generating resultant force P0. Consequently, the tension member 2 moves toward the direction of resultant force P0 depending on a material or a surface state of the support member 6, making it impossible to accurately detect deformation of the tension member 2.

The groove 7 solves this problem in the example of FIG. 6. Especially, as shown in FIGS. 6(*a*) and 6(*b*), the common support member 6 supports a plurality of tension members 2 arranged adjacently to each other. In this case, providing a groove to independently guide each tension member 2 can prevent the tension members 2 from being entangled or interfered with each other when the movable member 1 is touched.

Figure 8:
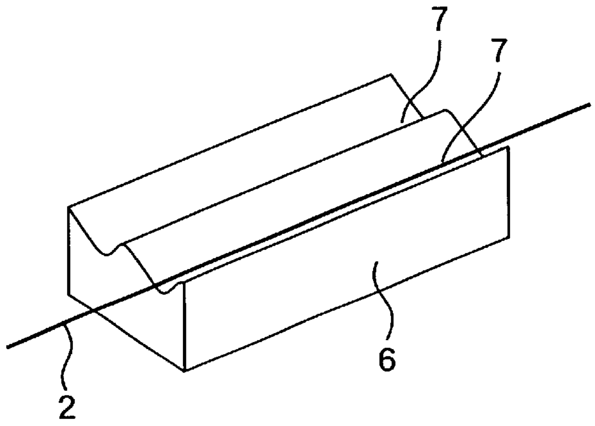
FIG. 8 is a perspective view schematically showing still another example of the electronic musical instrument operation apparatus according to the present invention.

FIG. 8 shows an example of the support member 6 extending along the tension member 2. As will be described later, the support member can comprise a soft part of a stopper acting on the sound generating operation element such as a key or on a member interlocking with this operation element. In this case, the support member is formed like a band continuously extending across a plurality of operation elements, etc. It is desirable to provide this band-shaped support member 6 with a groove extending along its lengthwise direction.

Figure 9:
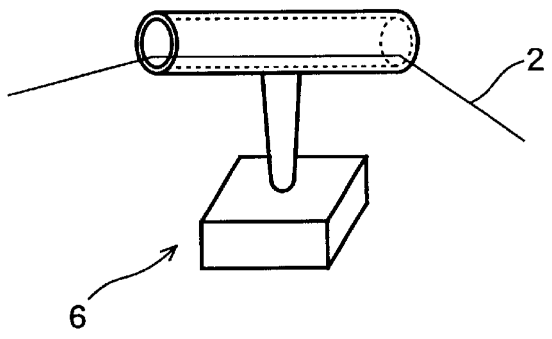
FIG. 9 is a perspective view schematically showing still another example of the electronic musical instrument operation apparatus according to the present invention.

FIG. 9 shows an example of the cylindrical support member 6 whose hollow part is threaded with the tension member 2. As will be described later, the tension member 2 can be configured so that the movable members touch the tension member 2 from a plurality of directions across an axial direction of the tension member 2. In this case, the cylindrical support member 6 is used to surround the tension member 2 as shown in FIG. 9. This can segment the moving area for the tension member in response to contacts from all directions.

Figure 10:
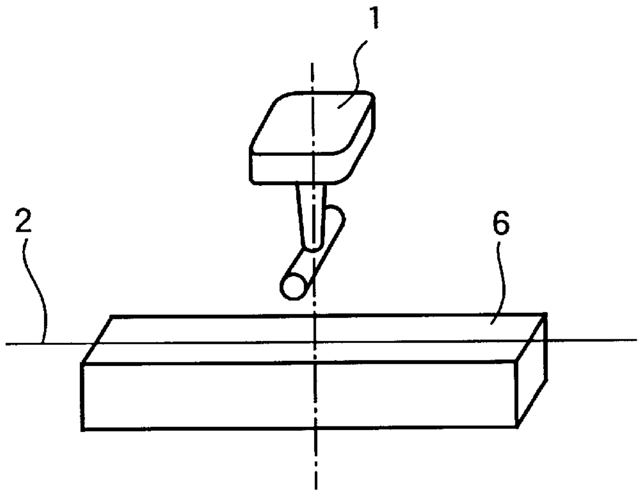
FIG. 10 is a perspective view schematically showing still another example of the electronic musical instrument operation apparatus according to the present invention.
Figure 11:
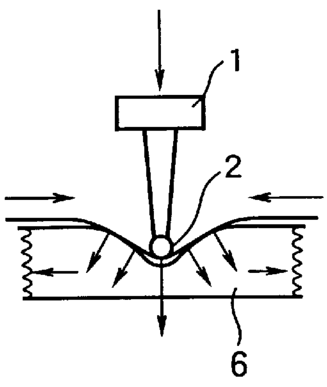
FIG. 11 is a front view showing an operating state of the operation apparatus.

FIG. 10 shows an example of the support member comprising a soft part of a stopper acting on the sound generating operation element such as a key or on a member interlocking with this operation element. A material for the support member 6 is selected so that an appropriate stop feeling is maintained at the time of manipulating the operation element such as pressing a key. For this purpose, the support member 6 needs to be somewhat flexible. This flexibility causes deformation as shown in FIG. 11 when the movable member 1 is touched. Namely, the support member 6 is greatly deformed in a recess at a portion in contact with the tension member 2. The both sides of the support member 6 are hardly deformed. These both sides segment a deformation region for the tension member and decrease an effect on portions corresponding to adjacent movable members 1. When the stopper's soft part forms the support member 6, it can continuously extend across a plurality of movable members. Further, it is possible to provide an effect of dividing deformation applied to the tension member by respective movable members. The adjustment described with reference to FIG. 5 is performed in order to optimally provide this segmentation effect. Moreover, it is possible to provide the groove as shown in FIG. 8 to this support member 6 also uses as the stopper.

Figure 12:
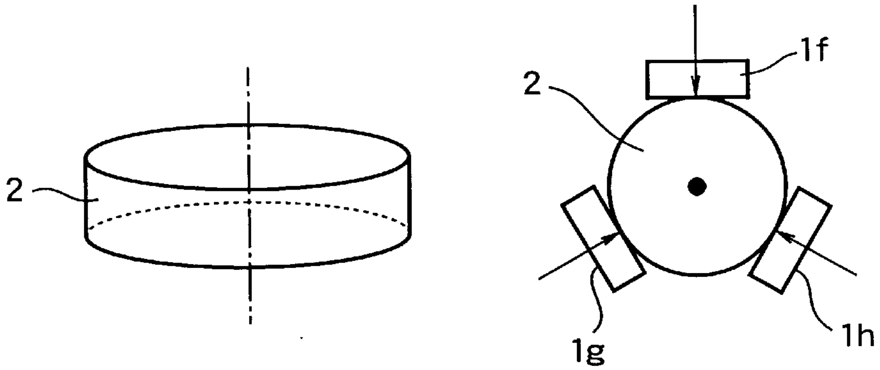
FIG. 12 is a perspective view schematically showing still another example of the electronic musical instrument operation apparatus according to the present invention.
Figure 13:
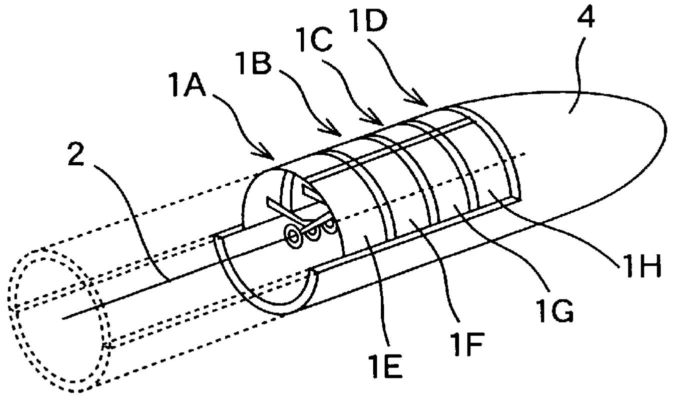
FIG. 13 is a perspective view schematically showing still another example of the electronic musical instrument operation apparatus according to the present invention.

FIG. 12 shows that the operation apparatus according to the present invention can be structured so that movable members touch the tension member 2 from various directions across the axis of the tension member 2. FIG. 13 illustrates an embodiment. In this example, there are provided the cylindrical support frame 4 and the tension member 2 stretched between both ends of this support frame. Like the aforementioned example, there are provided, although not shown, the detector and the elastic member near one end of the tension member 2. The detector is connected to the control section. An aperture is provided on a side wall of the support frame 4. In this aperture, the movable members 1 (1A through 1H) are attached in a reciprocatory manner along a radial direction of the support frame 4. Each movable member can connect with a specific sound generation switch (not shown). As shown in the example of FIG. 13, the movable member is connected to the tension member 2 by means of a rod provided along the radial direction. Pressing the movable member generates deflection on the tension member. Like the aforementioned example, this enables control of the musical sound through the detection capability of the detector. When the movable members cause different movement directions as shown in this example, a signal corresponding to the movement direction is added to the musical sound control, enabling different types of musical sound control that depend on movement directions. For example, the movable member along one movement direction is interlocked with a key. The movable member along another movement direction is interlocked with a drive section leading to a mouthpiece. This arrangement enables different musical sound controls by means of a hand or finger operation and a mouth operation for blowing air. When the movable members move in different directions, it is desirable to provide the cylindrical support member as shown in FIG. 9 between movable members.

Figure 14:
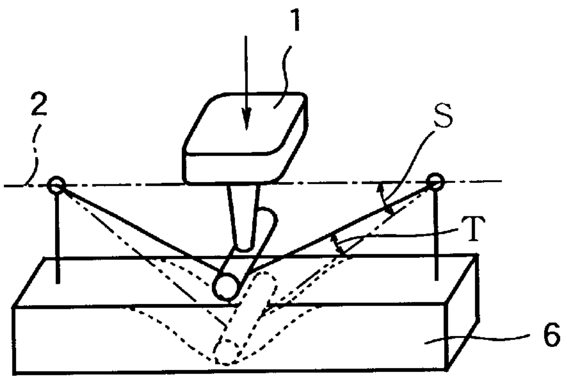
FIG. 14 illustrates operations of a movable member and a tension member in the example of the electronic musical instrument operation apparatus according to the present invention.

Also in FIG. 14, the support member comprises a soft part of a stopper acting on the sound generating operation element such as a key or on a member (movable member) interlocking with this operation element. In this case, FIG. 14 shows the relationship between a range of movement for the movable member 1 and positions of the support member 6. Range S in the figure shows a total movement rage for the movable member 1. Range T shows a range in which the movable member can further advance after the movable member is stopped by the stopper (support member 6). An electronic musical instrument provides after-touch control by detecting the movement of the movable member chiefly in range T. In the operation apparatus according to the present invention, the detector is configured so as to detect a change in the tension member within such a range. However, the present invention is not limited thereto. The detector may detect movement in range S or part thereof.

Figure 15:
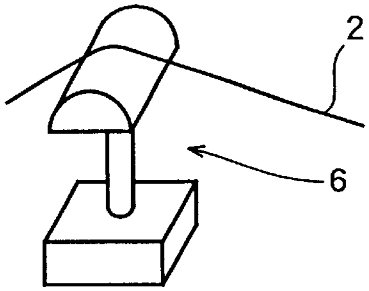
FIG. 15 is a perspective view showing an example of a support member used for the electronic musical instrument operation apparatus according to the present invention.
Figure 16:
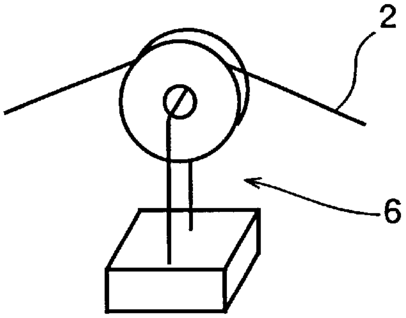
FIG. 16 is a perspective view showing another example of the support member used for the electronic musical instrument operation apparatus according to the present invention.

FIGS. 15 and 16 exemplify shapes of the support member 6. As shown in FIG. 15, the support member 6 preferably has a smooth, convex surface in contact with the tension member 2. This smoothes movement of the tension member 2 and improves the tension member durability. When the support member 6 is provided with a pulley as shown in FIG. 16, the tension member 2 moves more smoothly.

Figure 17:
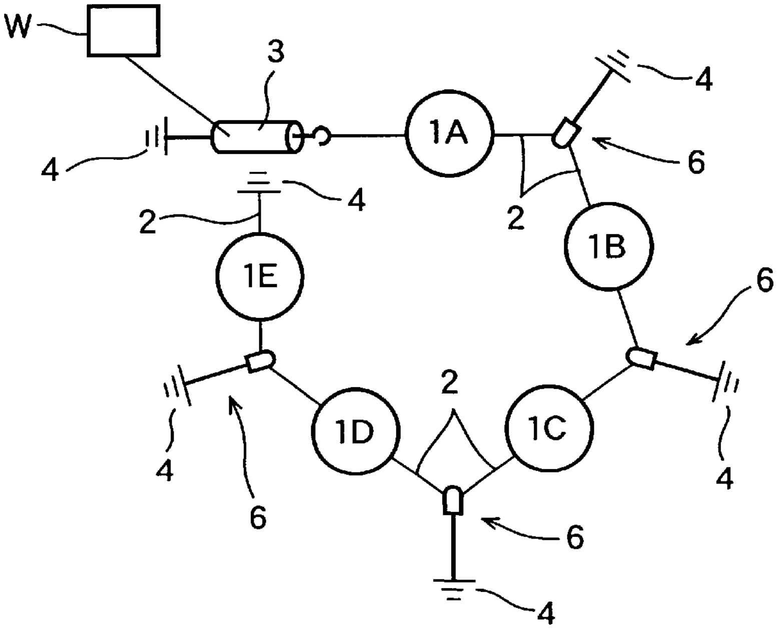
FIG. 17 is a perspective view showing yet another example of the support member used for the electronic musical instrument operation apparatus according to the present invention.

FIG. 17 exemplifies an operation apparatus in which the support members 6 are arranged in a ring and the tension member 2 is extended along the ring. One end of the round extending tension member 2 is fixed to the support frame 4. The other end is connected to the support frame 4 via the detector 3 including the elastic member 5. The movable members 1A to 1E are arranged on portions of the tension member 2 segmented by the support members 6. When the movable member moves to deflect the tension member 2 also in this operation apparatus, the detector 3 detects this deflection for musical sound control.

Figure 18:
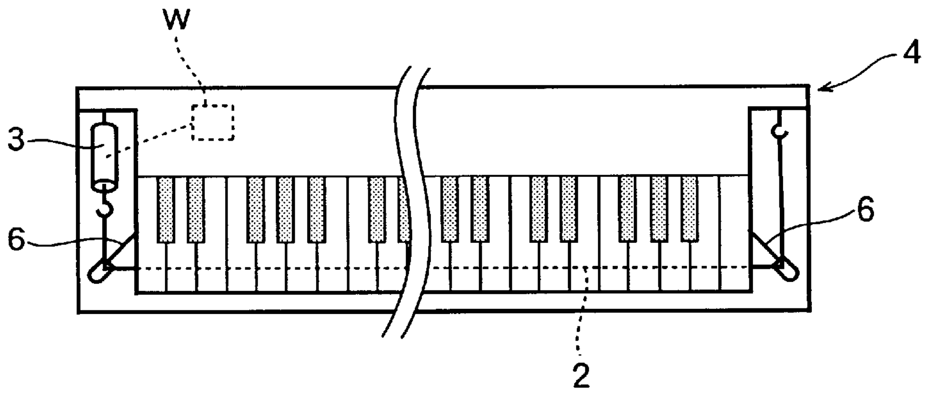
FIG. 18 is a plan view showing an example of using the inventive operation apparatus for an electronic keyboard instrument.

FIG. 18 shows an example of mounting the operation apparatus according to the present invention on an electronic keyboard instrument. In this case, there is no space for arranging the detector 3 along elongation of the tension member 2. Accordingly, the detector 3 is arranged at the rear of the instrument (further from a player) by using the support member to change the direction of the tension member 2 near its end. The other end of the tension member 2 is fixed to the support frame 4 at the rear of the instrument by changing the direction of the tension member 2 near its end via the support member 6. In this manner, the support member 6 can be also used for changing the elongation direction of the tension member 2 as needed.

Figure 19:
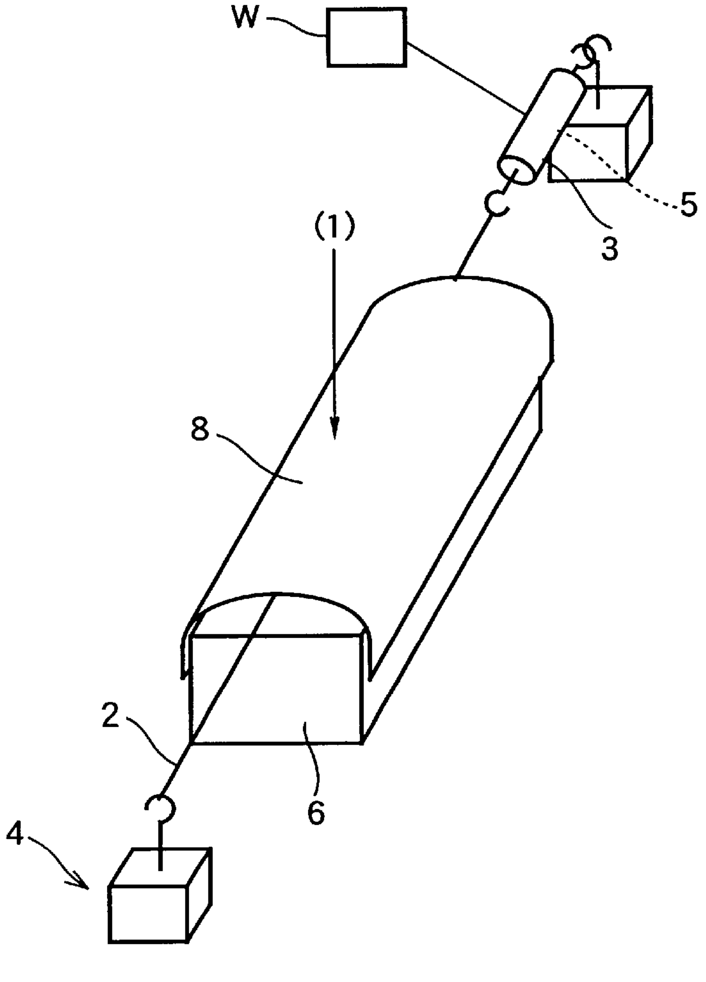
FIG. 19 is a perspective view showing an example of a support member used for the electronic musical instrument operation apparatus according to the present invention.

FIG. 19 shows a structure using the operation apparatus as shown in FIG. 10. Namely, the support member comprises a soft part of a stopper acting on the sound generating operation element such as a key or on a member interlocking with this operation element. In this example, there is further provided a soft cover 8 which covers the support member 6 and the tension member 2 extending over this support member. This soft cover 8 has flexibility capable of transmitting contact pressure of the movable member 1 near its contact point of this movable member.

Figure 20:
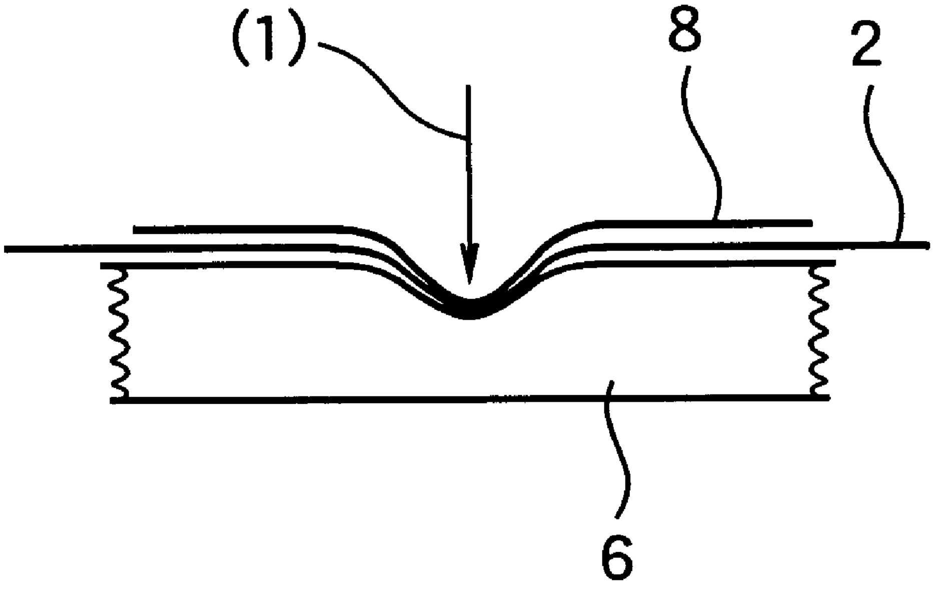
FIG. 20 is a front view showing an operation state of the operation apparatus in FIG. 19.

The operation apparatus operates as follows. As shown in FIG. 20, when the movable member 1 touches, the support member 6 is locally deformed due to its flexibility in a recess at a portion in contact with the tension member 2. The both sides of the support member 6 are hardly deformed. These both sides segment a deformation region for the tension member and decrease an effect on portions corresponding to adjacent movable members 1. The soft cover 8, also having flexibility, can transmit contact pressure of the movable member 1 to the vicinity of the contact point of this movable member. Accordingly, an operation of the movable member 1 is reliably transmitted to the tension member via the soft cover 8. The support member 6 reliably segments a deformation region. This enables the accurate musical sound control for each movable member. Further, the tension member does not directly contact with the movable member 1, generating no frictional force due to a direct contact. The tension member is reliably positioned on the support member 6 and improves the durability.

The following describes an example of the operation apparatus according to an embodiment of the present invention installed on an electronic piano with reference to the accompanying drawings. In the figures to follow, the front means a side toward a keyboard player; the rear means the opposite side.

Figure 21:
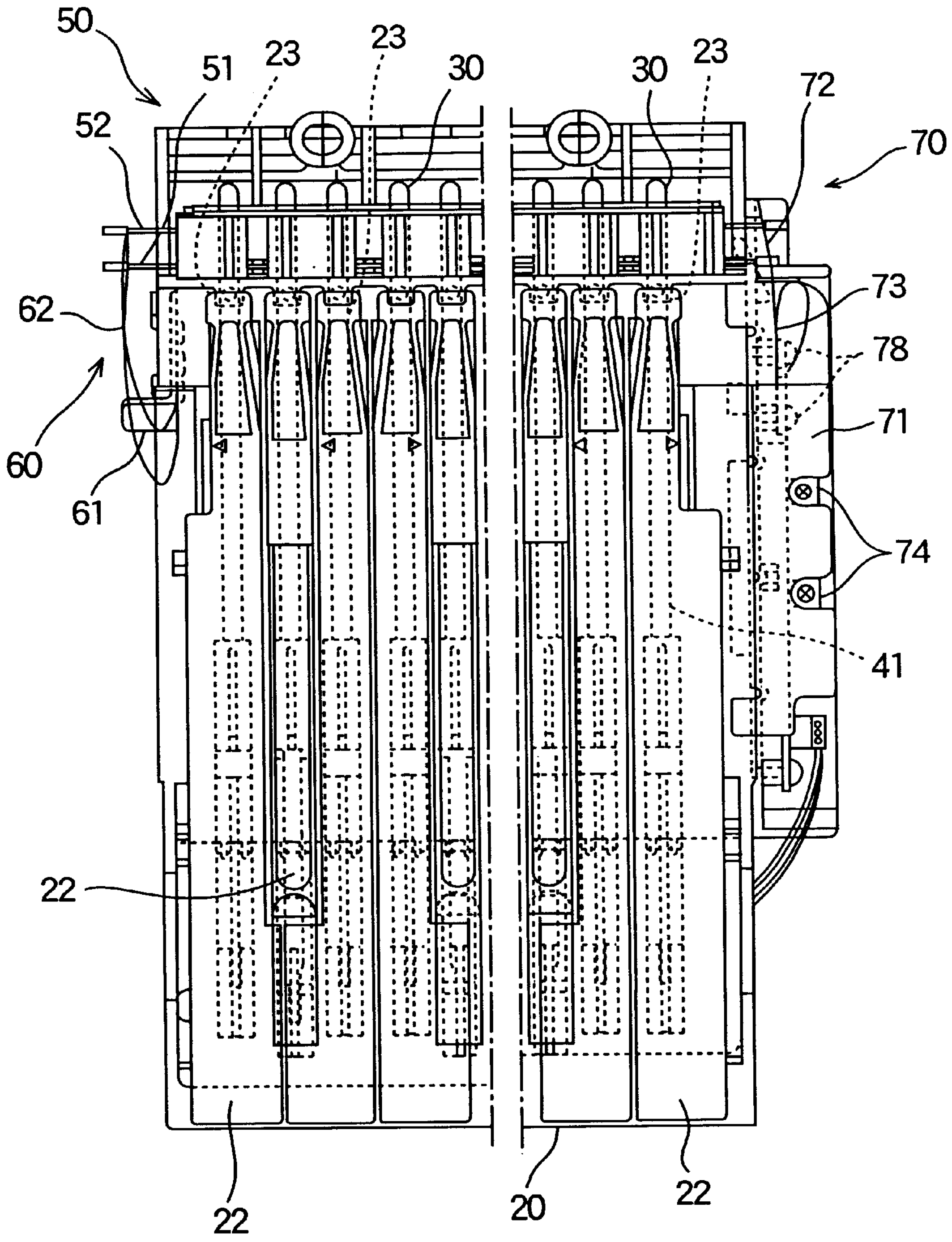
FIG. 21 is a plan view showing a keyboard operation apparatus according to the present invention as an example installed on the electronic piano.
Figure 22:
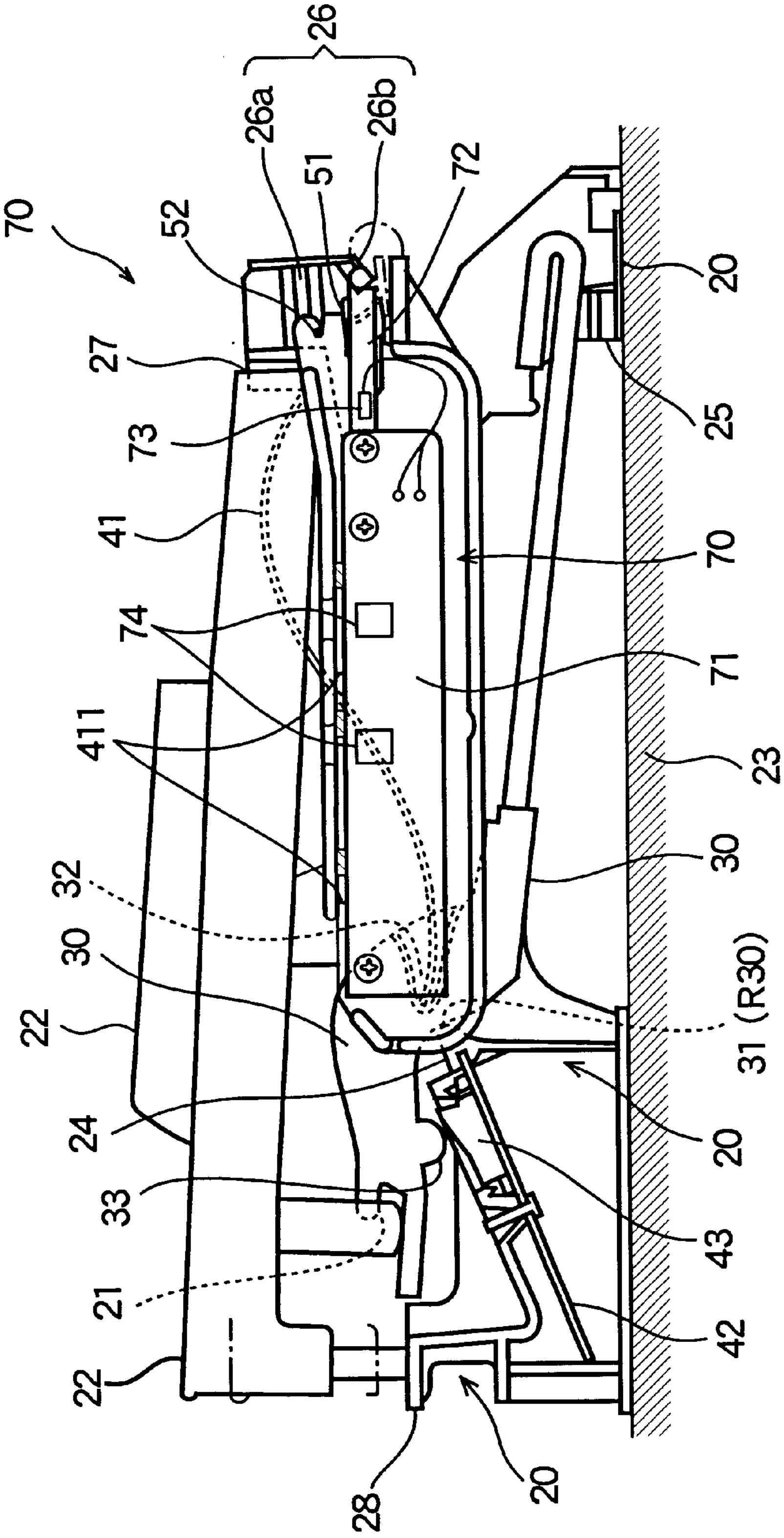
FIG. 22 is a right side view of the keyboard operation apparatus in FIG. 21.
Figure 23:
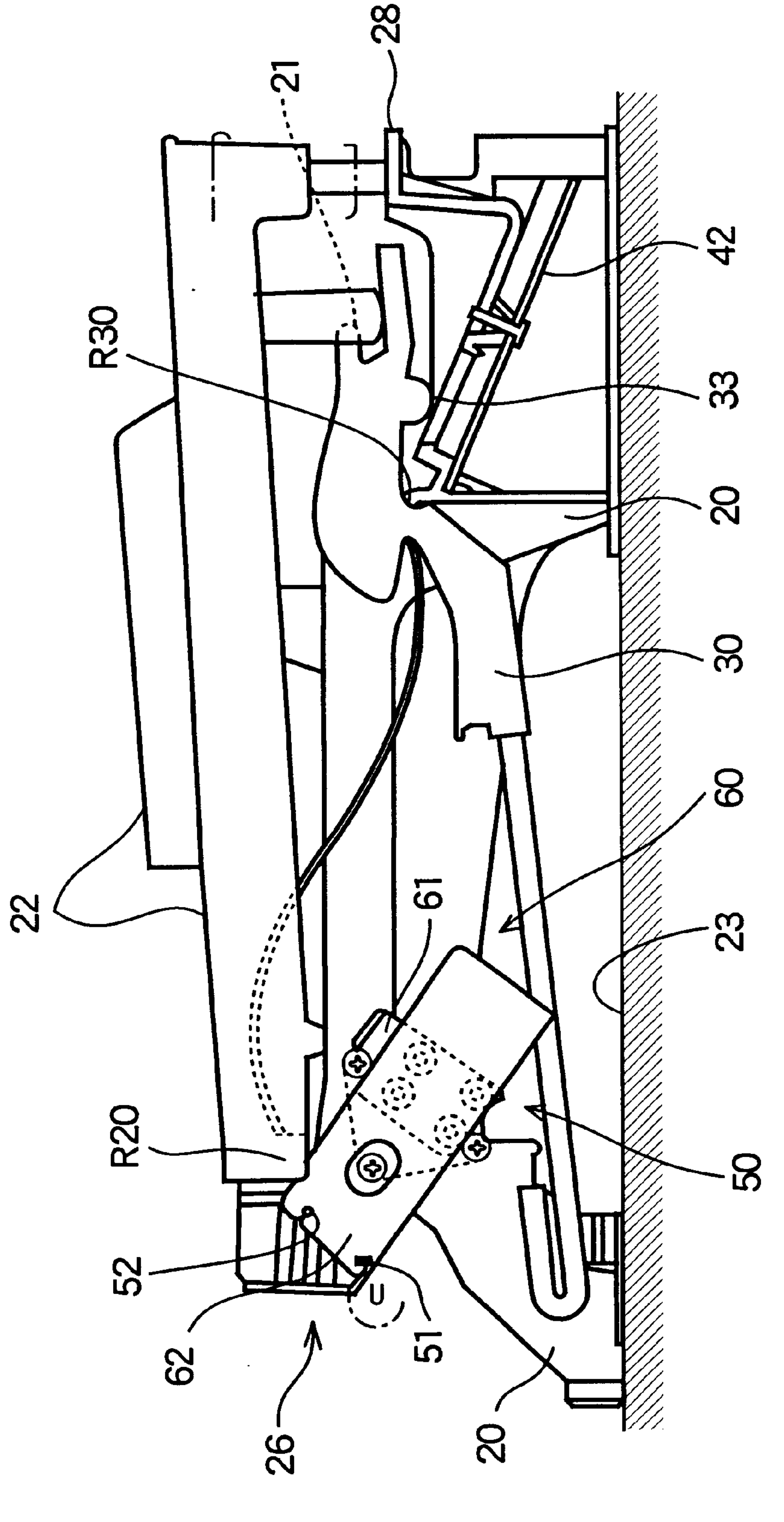
FIG. 23 is a left side view of the keyboard operation apparatus in FIG. 21.

FIGS. 21, 22, and 23 are a plan view, a right side view, and a left side view of the electronic piano keyboard apparatus, respectively. On this keyboard apparatus, a keyboard frame 20 (part of the support frame) supports all keys. A stationary column plate 23 supports the keyboard frame 20. Keys 22 comprise a white key and a black key. Each key functions as a first movable member operated by the player. A support member 27 extends along a row of keys at the rear part of the keyboard frame 20. This support member pivotally supports each key in a vertical direction around a rotation center R20 near a contact point with the support member. Below the key 22, the keyboard frame 20 supports a second movable member 30. As a whole, the second movable member 30 almost horizontally extends in the front-to-rear direction. A support piece 24 is allowed to stand toward the front of the keyboard frame 20. A recess 31 receives this support piece. By means of the support piece 24 and the recess 31, the second movable member pivots around the tip of the support piece as a rotation center R30. In order to maintain an engaged state of the tip of the support piece 24 and the recess 31, one end of an S-shaped spring 41 presses a spring holding section 32. This section is provided at the rear of the recess 31 in the second movable member 30 and comprises recesses formed on both sides. The spring holding section 32 is formed of a rib having a specified width in the thickness direction of the second movable member. A thin plate section orthogonally extends at the center of the width direction of the rib in the spring holding section 32. The S-shaped spring 41 is fixed to the spring holding section 32. The end of this spring is forked with a slit at its center. The above-mentioned thin plate section is inserted into this slit for engagement. The middle of the spring 41 presses and contacts the edge of a spring through-hole 411 almost at the center of the top of the keyboard frame 20 in the front-to-rear direction. The other end of the spring 41 is configured to press a spring receptacle under the rear of the key. According to this configuration, the S-shaped spring 41 presses the second movable member 30 to the tip of the support piece 24 at the spring holding section 32 and downward presses the rear part of the second movable member from the rotation center R30.

The front end of the second movable member 30 touches the bottom end of a pendent piece 21 and rotates in link with the key 22 when the key is depressed. The keyboard frame 20 supports a switch substrate 42 near under the front end of the second movable member 30. To this substrate, there is fixed a key switch 43 formed of domed rubber. On the front bottom surface of the second movable member 30, there is provided a switch drive section 33 having a pair of downward extending legs at a position corresponding to these conduction members 42. The switch drive section 33, the switch substrate 42, and the key switch 43 configure a key press switch which senses a key press speed by using a conduction start time difference at a key press due to a difference between two contact distances in the key switch.

The second movable member 30 extends to the rear part of the keyboard frame 20. At a rest position (when the key is not pressed), the second movable member 30 is supported near the rear end by a felt stopper member 25 fixed on the keyboard frame 20. When the key 22 is pressed, the second movable member 30 moves from the rest position indicated by the solid line to a depressed position indicated by the dot-dash line. A stopper member 26 is provided just after the key 22 on the keyboard frame 20, and stops the second movable member 30 moved to the depressed position. The stopper member 26 comprises a damper felt 26*a* covered with a protective cover sheet 26*b*. The rear end of the second movable member 30 presses the damper felt 26*a* via the protective cover sheet 26*b*. Normally, the damper felt 26*a* comprises a layer of felts with an appropriate stiffness so as to provide a dumping effect for absorbing a shock against the rear end of the second movable member 30 and to provide a secure stop feeling for player's hands and fingers. The second movable member 30 is made of plastic from the front to the vicinity of rotation center R30 and contains a metal bar as a mass member extending from the rear end. The mass of the metal bar extending toward the rear end creates an inertial touch or resistance when the key is pressed.

An operation apparatus 50 according to the present invention is configured at the rear part of the keyboard frame 20. As a whole, the operation apparatus 50 has a structure of supporting two tension members on both sides of the keyboard. A first tension member 51, one of two tension members, is used for sensing. This sensing tension member is placed between the damper felt 26*a* and the protective cover sheet 26*b* for the stopper member 26, and extends along a row of keys on the keyboard apparatus. This damper felt 26*a* constitutes the support member in the present invention, and the protective cover sheet 26*b* constitutes the soft cover member. The other tension member 52 is used for compensation in order to eliminate or decrease an ambient affect on the tension member 51, and is used for detecting disturbance factors. The tension member 52 is equivalent to a reference member. The compensating tension member 52 extends in parallel with the detecting tension member 51 at a position slightly away from the stopper member 26 so as not to touch the second movable member 30.

Namely, the inventive operation apparatus responds to a physical action for inputting a control parameter of a musical sound into an electronic musical instrument. In the operation apparatus, the array of the keys individually respond to the physical action to undergo a reciprocal movement for generation of the musical sound. The frame mounts the array of the keys. The sensing tension member 51 has a length defined between a pair of ends, and is supported at the ends thereof by the frame to extend along the array of the keys such that the sensing tension member 51 creates a deflection by the reciprocal movement of at least one of the keys. The detector is connected to the sensing tension member 51 for detecting a change of the length of the sensing tension member caused by the deflection under an external disturbance, and generating a signal corresponding to the change of the length as the control parameter. The compensating tension member 52 is supported by the frame to extend in parallel to the sensing tension member 51 for canceling out the external disturbance from the change of the length of the sensing tension member 51.

Outside the left end of a row of keys, there is provided a stretch section 60 supported by the keyboard frame 20. The stretch section 60 comprises a holding member 61 fixed to the keyboard frame 20 and a mounting leaf spring 62 installed on the holding member 61. The mounting leaf spring 62 extends from the holding member 61 toward the rear end, then is folded to form a V shape, allowing a small groove to be formed at its free end. The folded mounting leaf spring 62 supports the detecting tension member 51 and the compensating tension member 52 so as to pull each end thereof. The leaf spring 62 has the folded V shape so as to provide a uniform tension or bias to the tension member although the total length of the folded leaf spring 62 is rather short.

Outside the right end of the array of keys, there is provided a detector 70 supported by the keyboard frame 20. The detector 70 has a sensing leaf spring 72 extending from a detecting circuit substrate 71. The bottom of the detecting leaf spring 72 is fixed to the circuit substrate 71 with a screw 78. The tip of the spring forms a small groove to support the detecting tension member 51 so as to pull its end. A distortion sensor 73 is attached to the vicinity of the bottom of the detecting leaf spring 72. In this example, the distortion sensor 73 comprises a piezoelectric gage. The circuit substrate 71 is provided with a circuit (not shown) for detecting an output signal from the distortion sensor 73 and an adjustment element 74 for fine adjustment. This circuit is further connected to an after-touch controller (not shown).

The array of the keys are individually responsive to a finger action with a variable after-touch, and the tension member extends along the array of the keys. The detector connected to the tension member generates a signal corresponding to the variable after-touch. On the right side of the row of keys, the end of the compensating tension member 52 is directly and rigidly supported by the keyboard frame 20.

The operation apparatus 50 further has the following settings. The mounting leaf spring 62 has a stronger spring force than the detecting leaf spring 72. The compensating tension member 52 has higher tensional stiffness than the detecting tension member 51. Namely, the compensating tension member 52 is rigidly and firmly supported at its right end by the keyboard frame 20 and is pulled at its left end by the mounting leaf spring 62 to maintain a specified stretch state. By contrast, the detecting tension member 51 is held at its left end together with the compensating tension member 52 by using the leaf spring 62 as a common holding section. The right end of the detecting tension member 51 is held by the free end of the detecting leaf spring 72 by bending this spring. Accordingly, the mounting leaf spring 62 has a strong spring force in order to stabilize the left end position with the compensating tension member 52 stretched. The compensating tension member 52 is given high tensional stiffness to prevent the detecting leaf spring 72 from deflecting excessively.

Namely, the inventive operation apparatus responds to a physical action for inputting a control parameter of a musical sound into an electronic musical instrument. In the operation apparatus, at least one movable member responds to the physical action to undergo a reciprocal movement for generation of the musical sound. The frame mounts the movable member. The sensing tension member 51 has a length defined between a pair of ends and has an expansion characteristic along the length dependently on an ambient disturbance. The sensing tension member 51 is supported at the ends thereof by the frame to extend along the movable member with a bias force such that the movable member may come into contact with the sensing tension member 51 during the course of the reciprocal movement. The detector is connected to the sensing tension member 51 for detecting a deflection of the sensing tension member 51 caused by the contact of the movable member and generating a signal corresponding to the detected deflection as the control parameter. The additional tension member 52 has substantially the same length as the sensing tension member 51 and substantially the same expansion characteristic as the sensing tension member 51. The additional tension member 52 is supported by the frame to extend in parallel to the sensing tension member 51 for stabilizing the bias force applied to the sensing tension member 51.

The following describes operations of this keyboard apparatus. FIG. 21 shows an inactive rest state before a key is pressed. When a key is pressed in this state, the key 22 pivots downward around the rotation center R20, allowing the pendent piece 21 to press the linked second movable member 30 downward. According to this operation, the second movable member 30 pivots around the rotation center R30. The switch drive section 33 falls toward the key switch 43. The switch drive section 33 of the key 22 contacts with the key switch 43 to turn on the key press switch, thereby operating the sound generating mechanism to generate a sound. In the meantime, the second movable member 30 raises its rear portion backward from the rotation center R30. Just after the switch drive section 33 contacts with the key switch 43, the rear end of the second movable member 30 touches the stopper member 26, thereby stopping the rotation of the second movable member 30 and the key 22.

Namely, in the inventive operation apparatus responsive to a physical action for inputting a control parameter of a musical sound into an electronic musical instrument, the movable member in the form of the key 22 responds to the physical action to undergo a reciprocal movement. The frame mounts the movable member 22. The tension member has a length defined between a pair of ends, and is supported at the ends thereof by the frame with a bias force. The operating member in the form of the second movable member 30 is opposed to the tension member in the frame, and is linked to the movable member 22 to transmit the reciprocal movement thereof with a certain magnification rate to the opposed tension member by a physical contact such that the tension member creates a deflection by the physical contact. The detector is connected to the tension member for detecting a change of the length of the tension member caused by the deflection, and for generating a signal corresponding to the change of the length as the control parameter.

The operation apparatus 50 operates as follows. With the key pressed, increasing or decreasing the key press force allows the rear end of the second movable member 30 to change the amount of deformation of the stopper member 26, especially its damper felt 26*a*. The detecting tension member 51 is held between the damper felt 26*a* and the protective cover sheet 26*b* of the stopper member 26. Accordingly, changing the deformation amount of the damper felt 26*a* also changes the meandering amount of the detecting tension member 51 due to the deflection. Increasing the meandering amount shortens a distance between the ends of the detecting tension member 51. This accordingly increases the deflection of the detecting leaf spring 72, thus increasing an output from the distortion sensor 73. By picking up this output change, it is possible to detect a change in the press force applied to the key after it is pressed. As described with the example in FIG. 10, when the second movable member 30 touches the stopper member, the damper felt 26*a* (support member) of the stopper member 26 is locally deformed due to its flexibility in a recess at a portion in contact with the tension member 51. Both sides of the support member are hardly deformed. These sides segment a deformation region for the tension member and decrease an effect on portions corresponding to adjacent movable members. The protective cover sheet 26*b* (soft cover), also having flexibility, can transmit contact pressure of the second movable member 30 to the vicinity of the contact point of this movable member. Accordingly, an operation of the second movable member 30 is reliably transmitted to the tension member via the protective cover sheet 26*b* (soft cover). The damper felt 26*a* (support member) reliably segments a deformation region. This enables the accurate musical sound control for each movable member. Further, the tension member does not directly contact with the movable member, generating no frictional force due to a direct contact. The tension member is reliably positioned on the damper felt 26*a* and improves the durability. Even when a plurality of keys are pressed concurrently, accurate after-touch control is available by reflecting the deformation of the stopper member 26 due to each key press on meandering of the detecting tension member 51.

Accordingly, the stopper member 26 can receive solely the inertia of the mass member in the stopping operation such that the inertia and the resultant impact pressure never distributes to surrounding members. The sensor 73 can receive and detect the impact pressure from the stopper member in the concentrated form. If the impact pressure is spread around the various members, the sensor cannot accurately detect the net amount of the impact pressure. According to the invention, the output impact force applied to the sensor accurately corresponds to the input depressing force applied to the key, thereby realizing an accurate after-touch control.

The inventive apparatus may have a limiter member 28 operative when the impact pressure exceeds a critical level for limiting the forward movement of the mass member, thereby avoiding the stopper member from excessively deforming by the impact pressure. The limiter 28 is positioned such as to limit further movement of the mass member when an excessive depressing pressure is applied to the key over the critical level, which would cause destructive deformation of the stopper member 26, thereby avoiding fatal damage of the stopper member. In the inventive operation apparatus, the stopper member 26 receives substantially all of the impact pressure from the key. Even if an excessive depressing force is applied to the key, the limiter 28 can effectively operate to restrict further advancement of the mass member to thereby avoid destruction of the stopper member and other associated member.

Namely, the inventive operation apparatus responds to a sequence of a depressing action and a releasing action for inputting a control parameter of a musical sound into an electronic musical instrument. In the operation apparatus, the key member responds to the depressing action followed by an after-touch action to undergo a primary forward movement, and responds to the releasing action to undergo a primary backward movement. The frame member is provided for pivotally supporting the key member to enable the sequence of the primary forward movement and the primary backward movement. The mass member is supported by the frame member and interlocked to the key member for undergoing a secondary forward movement corresponding to the primary forward movement and a secondary backward movement corresponding to the secondary backward movement. The stationary base is integrated with the frame member. The stopper member 26 is supported by the stationary base for stopping the secondary forward movement of the mass member by a contact with the mass member such that the stopper member 26 can solely receive an impact pressure caused by the contact with the mass member. The detector is coupled to the stopper member 26 and is operative in response to the impact pressure received by the stopper member 26 for generating the control parameter indicative of the after-touch action. Further, the limiter member 28 is operative when the impact pressure exceeds a critical level for limiting the secondary forward movement of the mass member, thereby avoiding the stopper member 26 from excessively deforming by the impact pressure. In such a case, the detector comprises a transmitting member in the form of the tension member that is coupled to the stopper member 26 and that is deformed by the impact pressure to create a dimensional variation, and a sensing element such as the piezoelectric element connected to the transmitting member for sensing the dimensional variation of the transmitting member to generate the signal.

The operation apparatus uses the long tension member extending along a row of keys. Accordingly, the tension member is easily subject to a length variation due to disturbance factors such as temperature, humidity, etc. after installation on the keyboard apparatus. When both ends of the sensing tension member are fixed to the keyboard frame, a disturbance factor disturbs original conditions such as temperature, humidity, etc. to miss-detect a distortion amount from the intermediate distortion sensor. This is because the tension member and the support frame have different expansion characteristics. Thus, a countermeasure must be taken against these disturbance factors for accurate after-touch control. This operation apparatus uses two tension members. The detecting tension member 51 is provided parallel to the compensating tension member 52. A spring force of the mounting leaf spring 62 is applied to the compensating tension member 52 to stretch this material. The detecting tension member 51 is supported at its one end on the mounting leaf spring 62 at the same position as the compensating tension member 52. The detecting tension member 51 itself is subject to a spring force of the detecting leaf spring 72. Accordingly, if a disturbance factor occurs, the compensating tension member 52 absorbs its influence, preventing the disturbance factor from spreading to the detecting tension member 51. Namely, if the thermal expansion occurs due to a temperature rise after installation on the keyboard apparatus, a bearing point of the mounting leaf spring 62 shifts by an amount equivalent to expansion of the tension member. The compensating tension member 52 and the detecting tension member 51 maintain the same thermal expansion amount. The mounting leaf spring 62 moves due to extension of the tension member. The detecting tension member 51 is supported at its one end by this spring position and does not spread an effect of the thermal expansion to the other end. Against an influence of humidity, the compensation is similarly conducted between the compensating tension member 52 and the detecting tension member 51 having the same expansion rate per humidity. The keyboard frame may be distorted by an external force due to installation or performance, thereby changing the tension member length. It is possible to decrease an influence of the external force by increasing the tensional stiffness of the compensating tension member 52 and strengthening the bias force of the mounting leaf spring.

As described above, the inventive operation apparatus responds to a physical action for inputting a control parameter of a musical sound into an electronic musical instrument. In the apparatus, at least one movable member is responsive to the physical action to undergo a reciprocal movement. The frame mounts the movable member. The first tension member has a length defined between a pair of ends and has an expansion characteristic along the length dependently on an ambient disturbance. The second tension member has substantially the same length as the first tension member and substantially the same expansion characteristic as the first tension member. Each of the first tension member and the second tension member is supported at the ends thereof by the frame to extend along the movable member such that the movable member may come into contact with the first tension member during the course of the reciprocal movement but not contact with the second tension member. The detector is connected to the first tension member for detecting a deflection of the first tension member caused by the contact of the movable member and generating a sensing signal corresponding to the detected deflection as the control parameter, and is also connected to the second tension member for generating a reference signal separately from the sensing signal. The calibrator is connected to the detector for calibrating the sensing signal according to the reference signal so as to cancel out the ambient disturbance from the sensing signal.

Figure 24:
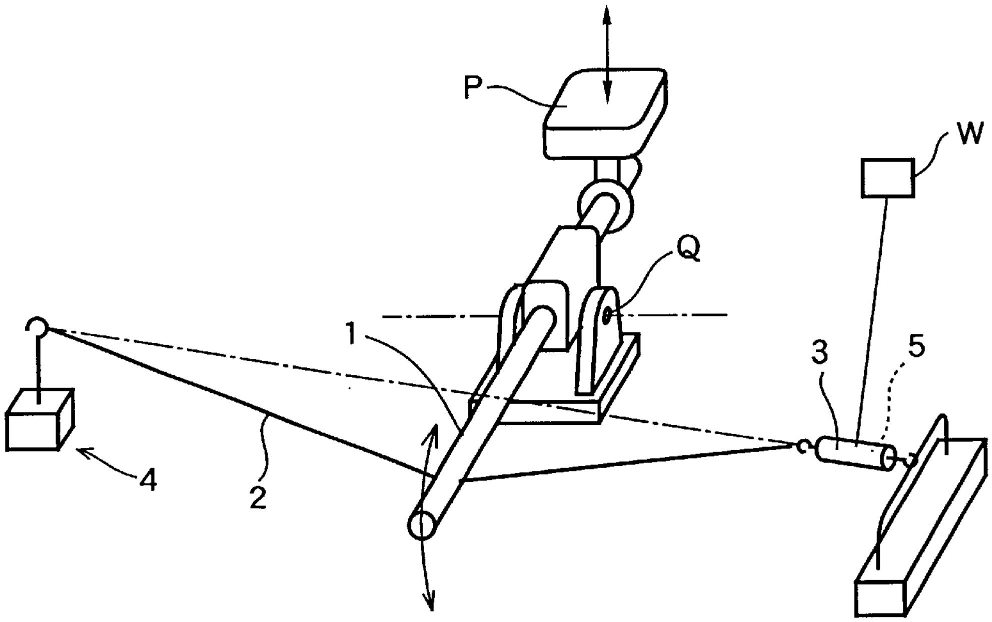
FIG. 24 is a perspective view schematically showing an example of the electronic musical instrument operation apparatus according to the present invention having a basic structure.
Figure 25:
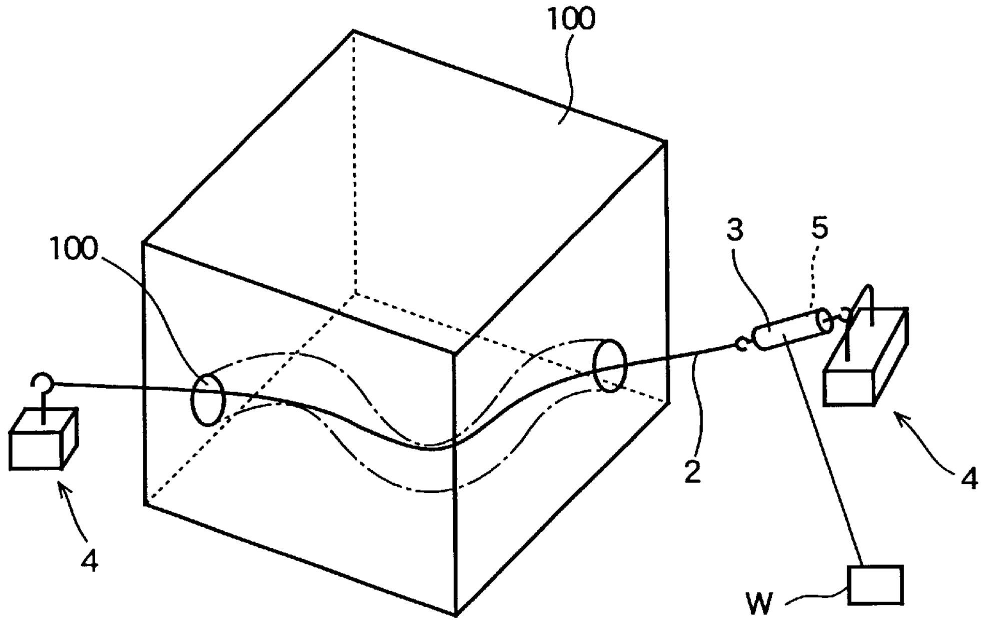
FIG. 25 is a perspective view schematically showing an example of an external force detection apparatus applicable to the present invention.

The following describes problems and solutions for a general external force detection mechanism also applicable to the electronic musical instrument operation apparatus. FIG. 24 schematically shows a movable member interlocking with one key and other movable parts extracted from FIG. 1 when the schematic operation apparatus in FIG. 1 is applied to a keyboard apparatus. As shown in the figure, actuator P connected to the key generates vertical movement which needs to be converted to rotational movement for the lever-shaped movable member 1. For this purpose, there are provided shaft Q as a rotation center and its support R. There are problems that this structure needs many parts and decreases a degree of freedom for application to other uses. These problems apply to various control mechanisms for detecting external forces. The following structure solves these problems. FIG. 25 shows an external force detection apparatus comprising the support frame 4, the tension member 2, the detector 3, the elastic member 5, and an enclosure member 100. The tension member 2 is stretched between the support frames. The detector 3 is provided to each tension member so as to detect a change in a lengthwise direction of the tension member. The elastic member 5 is placed between the support frame and one end of the tension member. The enclosure member 100 covers at least part of the tension member so as to cause movement relative to the tension member by applying an external force. The enclosure member 100 has a path 101 for passing the tension member 2. The shape and the material of the path 101 are determined so that an external force can be applied to move or deform the path 101 to expand or contract the tension member 2 in the path 101. The external force may be caused by part of a human body such as a hand and a foot or a control mechanism.

Figure 26:
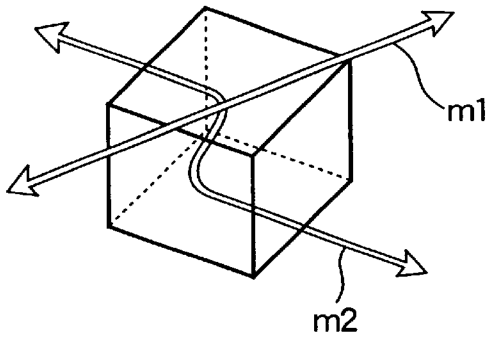
FIGS. 26(*a*)–26(*c*) illustrate operational states of the external force detection apparatus in FIG. 25.
Figure 26:
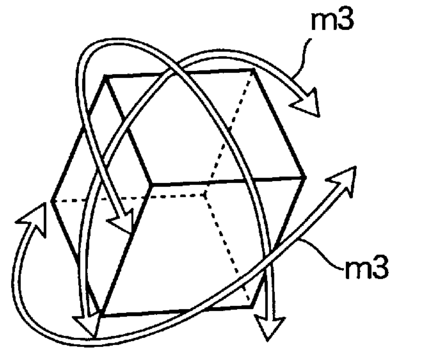
Figure 26:
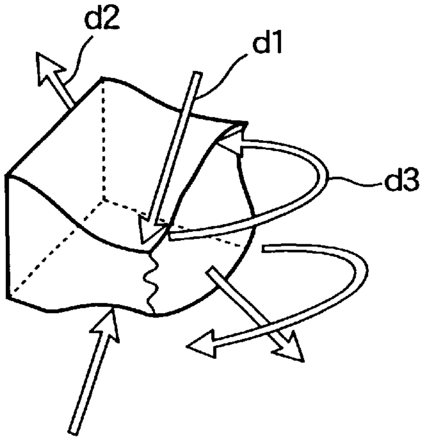

FIG. 26 shows various forms of movement and deformation which can be applied to the enclosure member 100. Namely, FIG. 26(*a*) shows linear movement m1 and 3D curve movement m2. FIG. 26(*b*) shows rotation and rolling m3. FIG. 26(*c*) shows stretched deformation d1, compressed deformation d2, and deformation d3 due to twist and shear. Further, a combination of any two of these examples is added as external forces. Due to these external forces, the tension member 2 passes through a specific path or causes expansion and contraction. If an external force varies continuously, the tension member 2 also changes the path or causes expansion and contraction continuously. The detector 3 detects a change thus resulting from the tension member. When the control section W processes this detection signal, the external force can be detected. Further, the processing by the control section W can be used for musical sound control corresponding to the external force. Accordingly, it is possible to detect an external force by using a small number of parts and easily apply this configuration to various fields.

Figure 27:
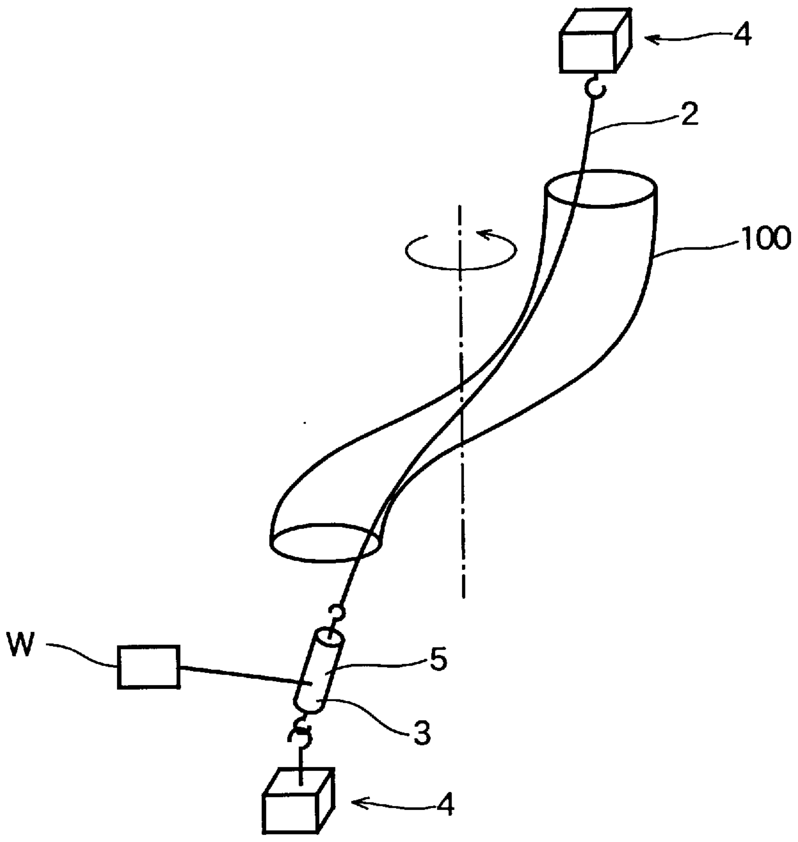
FIG. 27 is a perspective view schematically showing another example of an external force detection apparatus applicable to the present invention.
Figure 28:
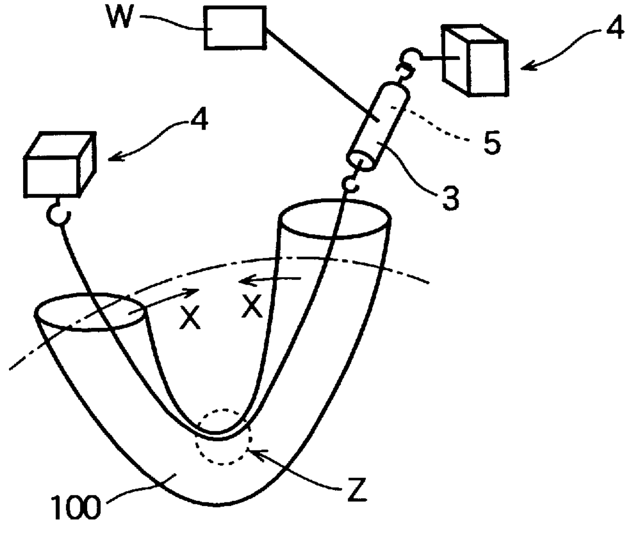
FIG. 28 illustrates operational states of the external force detection apparatus in FIG. 27.

FIGS. 27 and 28 show the tubular enclosure member 100 extending and surrounding the tension member 2. The tubular member is a closed-curve continuum and can provide a surrounding structure through a simple operation by passing a stretch member. When passing through the tubular member, the tension member is not subject to a local bend exceeding a shape or deformation of the tubular member. It is possible to properly control the tension member by decreasing factors such as friction for preventing displacement or expansion and contraction of the tension member. FIG. 27 shows that the enclosure member 100 rotates around axis L. FIG. 28 shows that the enclosure member 100 is bent in the direction of arrow X. As indicated by portion Z in FIG. 28, the tension member 2 is not subject to a local bend even if a strong bending force is applied to the enclosure member 100.

Figure 29:
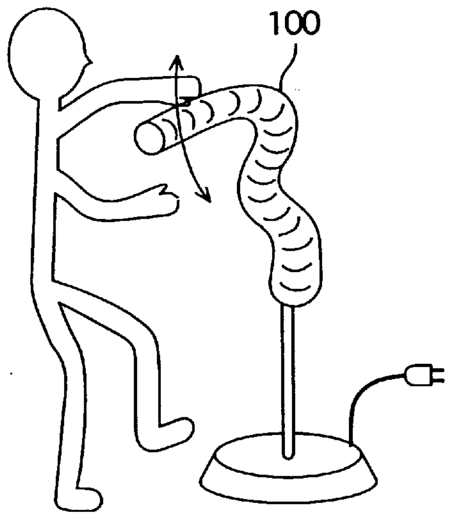
FIG. 29 is a perspective view showing an application of the external force detection apparatus in FIG. 27.
Figure 30:
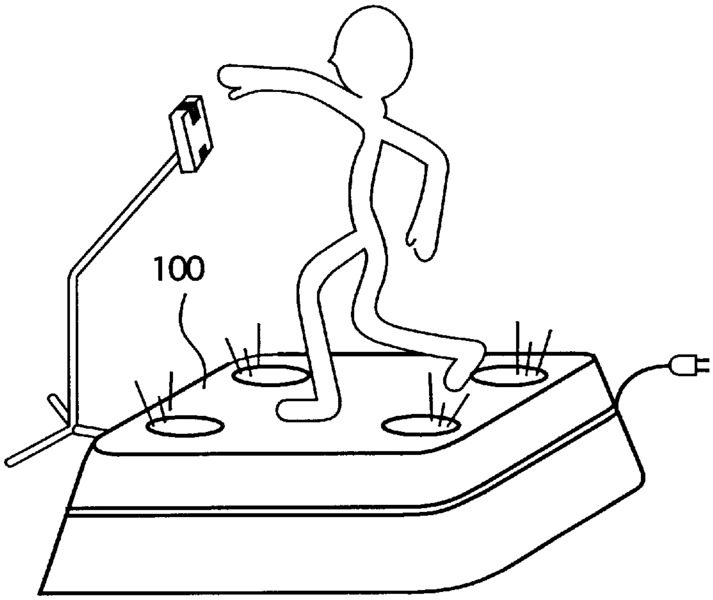
FIG. 30 is a perspective view showing another application of the external force detection apparatus in FIG. 25.

FIGS. 29 and 30 show examples of applying the external force detection apparatuses shown in FIGS. 25 through 28 to the control mechanism. The control mechanism in FIG. 29 comprises the deflectable annular enclosure member 100. Deforming this mechanism by hand changes the tension member (not shown) in a lengthwise direction to control the sound generated from the sounding apparatus. The control mechanism in FIG. 30 comprises the flat enclosure member 100 having a stage form. When a player mounts this control mechanism and performs dance steps etc., the built-in tension member (not shown) causes a change in a lengthwise direction according to a weight shift. The detector detects this change to provide control such as varying the generated sound or operating the stage lighting.

The electronic musical instrument functions as a type of man-machine interface. The interface includes various operation elements such as a panel switch, volume slider, rotary knob, wheel, pedal, keyboard, etc. As the interface, there are also provided parts for receiving a force through a drumstick etc., detecting heat or light, and a part for microphone input such as a vocoder or pitch changer. The external force detection apparatus according to the present invention applies a string system using the tension member to a part for detecting a physical quantity change to be input to the electronic musical instrument. This enables stable operations with a simple structure. Further, it is possible to provide high accuracy, high durability, and excellent touch feeling as needed. As mentioned above, the present invention can provide an electronic musical instrument operation apparatus which produces the following effects.

The operation apparatus according to the present invention supports the tension member via the elastic member on the support frame for supporting the movable member. The detector is provided to detect a change of the tension member in a lengthwise direction. The support frame is provided with the support member touching the tension member so that tension member deflection due to a movable member's contact pressure is restricted not to spread toward a lengthwise direction of the tension member. Accordingly, an area segmented by the support member limits the spread of tension member deflection due to contact with the movable member. Therefore, the detector can reliably detect the tension member movement, i.e., a movable member's stroke independently of how a plurality of movable members moves. This can accurately control the musical sound with a simple structure.

The aforementioned support member can be provided between adjacent movable members. Especially in this case, each movable member segments the spread of tension member deflection due to contact with the movable member. The detector can more accurately detect an independent portion of the deflection.

When the support member has a groove for receiving the tension member on a surface touching the tension member, it is possible to support the tension member by receiving it in the groove. When the movable member moves the tension member, the tension member moves without coming out of the groove, thus stabilizing operations. As a result, a tension member change can be detected more accurately.

The support member can comprise a soft part of a stopper acting on the sound generating operation element such as a key or on a member interlocking with this operation element. When the movable member touches, the support member is locally deformed due to its flexibility in a recess at a portion in contact with the tension member 2. The both sides of the support member are hardly deformed. These both sides segment a deformation region for the tension member and decrease an effect on portions corresponding to adjacent movable members. Accordingly, the support member continuously extends across a plurality of movable members and segments deformation given to the tension member by individual movable members.

What is claimed is:

1. An operation apparatus responsive to a physical action for inputting a control parameter of a musical sound into an electronic musical instrument, the apparatus comprising:

a plurality of movable members individually responsive to the physical action to undergo a reciprocal movement;

a frame that mounts the plurality of the movable members;

a tension member having a length and a pair of ends, and being supported at the ends by the frame to extend along the movable members;

a detector connected to the tension member for detecting a deflection of the tension member caused by a contact by a movable member, and generating a signal corresponding to the detected deflection as the control parameter; and a support member arranged on the frame for supporting the tension member such that the support member sections the length of the tension member and acts on the tension member to restrict the deflection thereof around the movable member which contacts the tension member, thereby avoiding the deflection from spreading along the length of the tension member.

2. The operation apparatus according to claim 1, wherein the support member is arranged between a pair of movable members which are aligned adjacently with one another.

3. The operation apparatus according to claim 1, wherein the support member has a groove for receiving therein the tension member.

4. The operation apparatus according to claim 1, further comprising an operating element manually operable for applying the physical action to the movable member, and a stopper provided on the frame for stopping the operating element, wherein the support member comprises a deformable soft part of the stopper.

5. The operation apparatus according to claim 1, further comprising a soft cover member that covers the tension member and the support member disposed along the tension member against the movable members, and that has a flexibility capable of transmitting the reciprocal movement of each movable member to the tension member to create the deflection.

6. The operation apparatus according to claim 1, further comprising an elastic member engaged between the frame and the end of the tension member for regulating the deflection of the tension member.

7. The operation apparatus according to claim 6, wherein the elastic member has a longitudinal shape and an elasticity along the longitudinal shape, such that the elastic member connects between the frame and the end of the tension member for regulating the deflection of the tension member by the elasticity.

8. The operation apparatus according to claim 6, wherein the elastic member has a folded shape and has an elasticity between a pair of open ends of the folded shape, such that one open end of the folded shape engages with the frame and the other open end of the folded shape engages with the end of the tension member for regulating the deflection of the tension member by the elasticity.

9. The operation apparatus according to claim 1, wherein the detector comprises a piezoelectric gage for detecting the deflection of the tension member caused by the contact of the movable member and generating a signal corresponding to the detected deflection.

10. The operation apparatus according to claim 1, wherein the plurality of movable members comprise an array of keys which are individually responsive to a finger action and which are mounted between a pair of sides of the frame, and wherein the tension member is supported by the sides of the frame to extend along the array of the keys, and the detector is attached to one side of the frame and connected to one end of the tension member.

11. The operation apparatus according to claim 1, wherein the plurality of movable members comprise an array of keys which are individually responsive to a finger action with a variable after-touch, and wherein the tension member extends along the array of the keys and the detector connected to the tension member generates a signal corresponding to the variable after-touch.

12. An operation apparatus responsive to a physical action for inputting a control parameter of a musical sound into an electronic musical instrument, the apparatus comprising:

at least one movable member responsive to the physical action to undergo a reciprocal movement;

a frame that mounts the movable member;

a first tension member having a length defined between a pair of ends and having an expansion characteristic along the length dependently on an ambient disturbance, and a second tension member having substantially the same length as the first tension member and substantially the same expansion characteristic as the first tension member, each of the first tension member and the second tension member being supported at the ends thereof by the frame to extend along the movable member such that the movable member contacts the first tension member during the course of the reciprocal movement but not in contact with the second tension member;

a detector being connected to the first tension member for detecting a deflection of the first tension member caused by the contact of the movable member and generating a sensing signal corresponding to the detected deflection as the control parameter, and being connected to the second tension member for generating a reference signal separately from the sensing signal; and a calibrator connected to the detector for calibrating the sensing signal according to the reference signal so as to cancel out the ambient disturbance from the sensing signal.

13. The operation apparatus according to claim 12, further comprising an elastic member engaged between the frame and each end of the first tension member and the second tension member for regulating a tension force applied to the first tension member and the second tension member.

14. An operation apparatus responsive to a physical action for inputting a control parameter of a musical sound into an electronic musical instrument, the apparatus comprising:

at least one movable member responsive to the physical action to undergo a reciprocal movement for generation of the musical sound;

a frame that mounts the movable member;

a sensing tension member having a length defined between a pair of ends and having an expansion characteristic along the length dependently on an ambient disturbance, the sensing tension member being supported at the ends thereof by the frame to extend along the movable member with a bias force such that the movable member contacts the sensing tension member during the course of the reciprocal movement;

a detector being connected to the sensing tension member for detecting a deflection of the sensing tension member caused by the contact of the movable member and generating a signal corresponding to the detected deflection as the control parameter; and an additional tension member having substantially the same length as the sensing tension member and substantially the same expansion characteristic as the sensing tension member, the additional tension member being supported by the frame to extend in parallel to the sensing tension member for stabilizing the bias force applied to the sensing tension member.

15. An operation apparatus responsive to a physical action for inputting a control parameter of a musical sound into an electronic musical instrument, the apparatus comprising:

an array of keys individually responsive to the physical action to undergo a reciprocal movement for generation of the musical sound;

a frame that mounts the array of the keys;

a sensing tension member having a length defined between a pair of ends, and being supported at the ends thereof by the frame to extend along the array of the keys such that the sensing tension member creates a deflection by the reciprocal movement of at least one of the keys;

a detector that is connected to the sensing tension member for detecting a change of the length of the sensing tension member caused by the deflection under an external disturbance, and generating a signal corresponding to the change of the length as the control parameter; and a compensating tension member that is supported by the frame to extend in parallel to the sensing tension member for canceling out the external disturbance from the change of the length of the sensing tension member.

16. An operation apparatus responsive to a physical action for inputting a control parameter of a musical sound into an electronic musical instrument, the apparatus comprising:

a movable member responsive to the physical action to undergo a reciprocal movement;

a frame that mounts the movable member;

a tension member having a length defined between a pair of ends, and being supported at the ends thereof by the frame with a bias force;

an operating member that is opposed to the tension member in the frame, and that is linked to the movable member to transmit the reciprocal movement thereof with a certain magnification rate to the opposed tension member by a physical contact such that the tension member creates a deflection by the physical contact; and a detector that is connected to the tension member for detecting a change of the length of the tension member caused by the deflection, and for generating a signal corresponding to the change of the length as the control parameter.

17. The operation apparatus according to claim 16, further comprising an elastic member engaged between the frame and the end of the tension member for applying the bias force to the tension member.

18. An operation apparatus responsive to a depressing action for inputting a control parameter of a musical sound into an electronic musical instrument, the apparatus comprising:

a key member responsive to the depressing action followed by a touch action to undergo a first movement;

a frame member for pivotally supporting the key member to enable the first movement of the key member;

a mass member supported by the frame member and contactable to the key member for undergoing a second movement in response to the first movement of the key member;

a stationary base integrated with the frame member;

a stopper member supported by the stationary base for stopping the second movement of the mass member by a contact with the mass member such that the stopper member receives an impact pressure caused solely by the contact with the mass member; and a detector coupled to the stopper member and operative in response to the impact pressure received by the stopper member for generating the control parameter indicative of the touch action, wherein the detector comprises a transmitting member that is coupled to the stopper member and that is deformed by the impact pressure to create a dimensional variation in a direction different from the direction of the impact pressure, and a sensing element connected to the transmitting member for sensing the dimensional variation of the transmitting member to generate the signal.

19. The operation apparatus according to claim 18, further comprising a limiter member operative when the impact pressure exceeds a critical level for limiting the second movement of the mass member, thereby avoiding the stopper member from excessively deforming by the impact pressure.

20. The operation apparatus according to claim 18, wherein the transmitting member includes a tension member having a length defined between a pair of ends, and being supported at the ends thereof by the frame member with a bias force to extend in a direction transverse to the direction of the impact pressure, the tension member being deformed by the impact pressure to create the dimensional variation in an extending direction of the tension member.

21. The operation apparatus according to claim 20, further comprising an elastic member engaged between the frame member and an end of the tension member for applying the bias force to the tension member.

* * * * *